(12) United States Patent
Harris

(10) Patent No.: US 11,824,896 B2
(45) Date of Patent: Nov. 21, 2023

(54) CROSS-SERVICE RULEBOOK MANAGEMENT IN A DYNAMIC AND ADVERSARIAL ENVIRONMENT

(71) Applicant: Exonym GmbH, Berlin (DE)

(72) Inventor: Michael Harris, Berlin (DE)

(73) Assignee: Exonym GmbH, Berlin (DE)

( * ) Notice: Subject to any disclaimer, the term of this patent is extended or adjusted under 35 U.S.C. 154(b) by 274 days.

(21) Appl. No.: 17/109,507

(22) Filed: Dec. 2, 2020

(65) Prior Publication Data

US 2021/0314362 A1 Oct. 7, 2021

Related U.S. Application Data

(60) Provisional application No. 63/005,918, filed on Apr. 6, 2020.

(51) Int. Cl.
H04L 9/40 (2022.01)

(52) U.S. Cl.
CPC .......... H04L 63/20 (2013.01); H04L 63/0853 (2013.01)

(58) Field of Classification Search
CPC ............................ H04L 63/20; H04L 63/0853
USPC ............................................................ 726/1
See application file for complete search history.

(56) References Cited

U.S. PATENT DOCUMENTS

| | | | |
|---|---|---|---|
| 7,386,722 B2 | 6/2008 | Umezawa et al. | |
| 8,327,423 B2 | 12/2012 | Zeng | |
| 9,407,637 B2 | 8/2016 | Patey et al. | |
| 9,608,993 B1 | 3/2017 | Camenisch et al. | |
| 9,690,920 B2 | 6/2017 | Marcus et al. | |
| 2008/0301175 A1* | 12/2008 | Applebaum | G06F 16/24565 707/999.102 |
| 2020/0065523 A1* | 2/2020 | Fukuda | H04L 51/046 |
| 2020/0213298 A1* | 7/2020 | Ericson | H04W 12/47 |

FOREIGN PATENT DOCUMENTS

| | | |
|---|---|---|
| WO | 02/49311 A2 | 6/2002 |
| WO | 2016/020497 A1 | 2/2016 |

OTHER PUBLICATIONS

Extended European Search Report, dated Aug. 27, 2021, for European Application No. 21166499.0-1222, 8 pages.
Borge et al., "Proof-of-Personhood: Redemocratizing Permissionless Cryptocurrencies," in Proceedings of the IEEE European Symposium on Security and Privacy Workshop, Paris, France, Apr. 26-28, 2017, 5 pages.
Binu, Sumitra, et al., "A Strong Single Sign-on User Authentication Scheme using Mobile Token without Verifier Table for Cloud Based Services," Computer and Network security Essentials, Chapter 14, Springer International Publishing AG 2018, pp. 237-261, 2018.

(Continued)

*Primary Examiner* — Anthony D Brown
(74) *Attorney, Agent, or Firm* — Seed IP Law Group LLP

(57) ABSTRACT

Performing a networked transaction with proof of honesty is described. An identity credential is generated for a user based on an underlying secret associated the user. The identity credential is augmented with Rulebook credentials, and proof of honesty based thereon is conveyed to another user. On this basis, the user is permitted to transact with the other user in connection with the proof of honesty.

21 Claims, 4 Drawing Sheets

(56) References Cited

OTHER PUBLICATIONS

Hajialikhani et al., "Unique ID: Decentralized Proof-of-Unique-Human," arXiv:1806.07583v1 [cs.CR], Jun. 20, 2018. 9 pages.
Hayton et al., "Access Control in an Open Distributed Environment," in Proceedings of IEEE Symposium on Security and Privacy, Oakland, United States, 1998, 12 pages.
Katzan, "Ontology of Trusted Identity in Cyberspace," Journal of Service Science. 4(1): 1-12, 2011.
Olivereau et al., "An Advanced Authorization Framework for IP-based B3G Systems," Proceedings of IST Mobile & Wireless Communications Summit, 2005, 5 pages.
Tsang et al., "BLAC: Revoking Repeatedly Misbehaving Anonymous Users without Relying on TTPs," ACM Transactions on Information and System Security, vol. 13, No. 4, Article 39, Pub. date: Dec. 2010, 33 pages.
Vossaert et al., "User-Centric Identity Management using Trusted Modules," European Public Key Infrastructure Workshop, Springer, 2010, 16 pages.
Xi et al., "FARB: Fast Anonymous Reputation-Based Blacklisting without TTPs," WPES'14, Nov. 3, 2014, Scottsdale, Arizona, USA, 10 pages.

\* cited by examiner

CROSS-SERVICE RULEBOOK MANAGEMENT IN A DYNAMIC AND ADVERSARIAL ENVIRONMENT

CROSS-REFERENCE TO RELATED APPLICATIONS

This application claims the benefit of provisional U.S. Application No. 63/005,918, filed Apr. 6, 2020 and entitled "CROSS-SERVICE RULEBOOK MANAGEMENT IN A DYNAMIC AND ADVERSARIAL ENVIRONMENT," which is hereby incorporated by reference in its entirety.

BACKGROUND

The Internet is the global system of interconnected computer networks that enables communication between networks and devices. It is a network of networks that includes private, public, academic, business, and government networks of local to global scope, linked by a broad array of electronic, optical, and wireless networking technologies. The Internet carries a vast range of information resources, services, and other utilities, such as the inter-linked hypertext documents and applications of the World Wide Web (WWW), electronic mail, telephony, and file sharing. The Internet has very limited centralized governance in either technological implementation or policies for access and usage.

DETAILED DESCRIPTION

Figure 1:
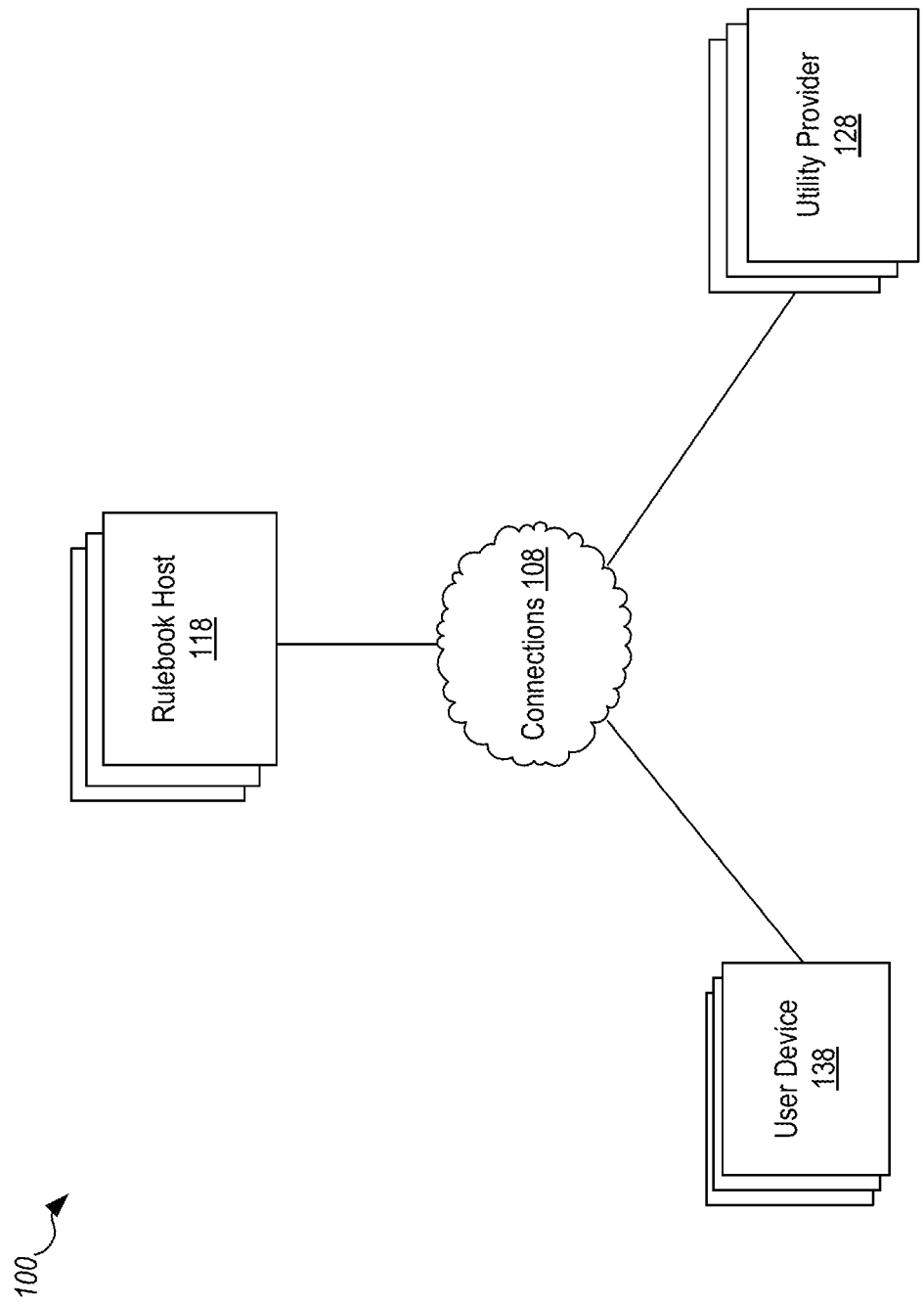
FIG. 1 is a block diagram illustrating an example networked environment for Rulebook management in accordance with some embodiments of the techniques described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

The inventor recognized that modern day Internet services are riddled with inappropriate accountability. Large service or content providers can circumvent their own accountability through simple power assertions and self-interested terms and conditions. The lack of proper accountability can be visited onto producers and consumers alike because they are often dependent on access to coercive environments. As an example, consider smartphones that force users to agree to invasive terms. To not have a smartphone is a caste-creating disadvantage, so users typically have no choice but to live under a type of autocracy of changing terms. The same can be said of many large web service providers (e.g., Google, Facebook, Amazon, or the like). Governing the Internet appears to give rise to unelected government and these boundaries have been tested by private corporations.

The inventor believes the appropriate response is to disentangle controls from the respective utility. As an example, to disentangle software integrity verification from the operating system provider would absolve the operation system provider of its responsibility to protect its customers. The inventor has recognized a change of focus from transactional integrity provided by companies to transactional integrity provided by impartial controls can help solve these problems. Impartial controls over an "open" web includes active management of context specific accountability.

The inventor has conceived and reduced to practice a software and/or hardware facility that provides a privilege layer on an anonymous, permissionless, distributed network facilitated by contingent membership. In some embodiments, membership in a Rulebook indicates that an actor is presently honest under the rules defined within a set of Rulebooks. For example, within a network of peer users, Alice can verifiably claim to an audience that she is honest under an auction Rulebook and if she breaks the rules, she will be appropriately held to account. In some embodiments, membership is contingent on a Rulebook host pseudonymously controlling for clones and checking for current or previous Rulebook membership, prior to granting membership.

As will be described in more detail below, in accordance with some embodiments of the present technology, user peers are self-sovereign in identity and anonymous. To transact, each peer reveals attributes and proves honesty to other peers. In some embodiments, proofs are voluntary. In some embodiments, proofs are required or requested only by the counterparty's need to protect themselves.

In some embodiments, a user's identity registration is enabled via an applicable form of decentralized anonymous credential (DAC). A DAC is self-registered and enables anonymous peer-to-peer (P2P) communication without involving a third party such as a Certification Authority (CA). By eliminating the involvement of a CA, a democratic governance system is facilitated. For example, peers will not be coerced by the organization that registers new identities or be consistently identified by public keys. A DAC commits a new identity to an underlying secret and allows someone with knowledge of the credential to prove membership of an accumulator by showing it.

After registration, the peer is free to augment their identity with credentials provided from many issuers (e.g., Rulebook hosts). A peer obtains capacity to prove honesty via the issuance of revocable credentials by one or more trusted Rulebook hosts. Proofs of honesty are cryptographic credentials and the peer has a wide choice of options to disclose data (e.g., proof of honesty under certain Rulebooks, attestation to certain attributes, or the like) with the credentials. In some embodiments, credentials are shown without the peer interacting with the issuer. This ensures that Rulebook hosts have no control over peer's transactions unless such control is granted by the peer. In some embodiments, peers can generate proof tokens until the privilege is revoked by host(s), if the credential is revocable. In some embodiments, peers can generate a single proof token with contributions from many issuers.

FIG. 1 is a block diagram illustrating an example networked environment 100 for Rulebook management in accordance with some embodiments of the techniques described herein. The exemplary networked environment 100 includes one or more Rulebook hosts 118, one or more utility providers 128, and one or more user devices 138, which are interconnected with one another via at least some part of connections 108.

In the depicted exemplary networked environment 100, the connections 108 may comprise one or more computer networks, one or more wired or wireless networks, satellite transmission media, one or more cellular networks, or some combination thereof. The connections 108 may include a publicly accessible network of linked networks, possibly operated by various distinct parties, such as the Internet. The connections 108 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the connections 108 may include various types of wired and/or wireless networks in various situations, including satellite transmission. In addition, the connections 108 may include one or more communication interfaces to individual entities in the networked environment 100, various other mobile devices, computing devices and media devices, including but not limited to, radio frequency (RF) transceivers, cellular communication interfaces and antennas, USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like.

In various embodiments, examples of a user device 138 include, but are not limited to, one or a combination of the following: a "computer," "mobile device," "tablet computer," "smart phone," "handheld computer," and/or "workstation," etc. The user device(s) 138 may be any suitable computing device or electronic equipment that is, e.g., operable to communicate with the Rulebook host(s) 118, utility provider(s) 128, and to interact with user(s) for utilize Internet utilities in connection with applicable Rulebook(s).

In various embodiments, individual Rulebook hosts 118 and utility providers 128 can be implemented in software and/or hardware form on one or more computing devices including a "computer," "mobile device," "tablet computer," "smart phone," "handheld computer," and/or "workstation," etc. The Rulebook host(s) 118 can perform rule management, user subscription, rule enforcement, and/or other Rulebook-related functions described herein. The utility provider(s) 128 can provide content, service, forum, or other Internet utilities. In some embodiments, a certain utility provider 128 is considered to be a user device 138 in accordance with the peer-to-peer framework of some implementation of the presently disclosed technology. In some embodiments, a certain utility provider 128 is considered to be a Rulebook host 118 in accordance with some implementation of the presently disclosed technology.

Data communications among entities of the networked environment 100 can be encrypted. Related encryption and decryption may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the exemplary networked environment 100 and the various service providers, systems, networks, and devices therein is intended as a broad, non-limiting overview of an exemplary environment in which various embodiments of the facility may be implemented. FIG. 1 illustrates just one example of an operating environment, and the various embodiments discussed herein are not limited to such environments. In particular, the networked environment 100 may contain other devices, systems and/or media not specifically described herein.

Rulebook Hierarchy

In some embodiments, a group of Rulebook host(s) 118 form a hierarchy or lattice of Rulebooks. To address context specific accountability, situational context can be used by Rulebook host(s) 118 to determine whether and how a rule is applied. For example, situational context can be informed by the epoch, regional laws, personal values, the transactional participants, the activity, individual awareness, individual intent, individual state of mind, and individual history. In accordance with some embodiments, the context of whether a control applies is facilitated by a 4-level hierarchy of Rulebooks. From more general to more specific: a universal context level defines the scope of the control, a national context level places limits on regional interpretations of the universal context, a personal context allows users to choose interpretations that are appropriate for them, and a transactional group level defines the transactional context. Illustratively, a transactional group includes a set of users associated with a utility provider 128 that facilitates a networking activity (e.g., a social network, web search, etc). Users subscribe to useful Rulebooks from a diverse offering in their country of residence.

In some embodiments, the universal context defines the lowest possible standard acceptable to the network. It is the foundation of a Rulebook, it is narrow in scope, and exclusive only to dishonest actors within that scope. For example, international laws and norms that inform its basis can be enumerated.

In some embodiments, the national and personal contexts define the broad spectrum of rules within the limits of the universal context. The national context limits interpretation of subjectivity to regional laws. For example, regional laws and norms that inform the regional context can be enumerated. The national context is optional, in the absence of sovereignty claims.

A user's choice of Rulebook can be based on user's personal values, and therefore define the personal context. A user chooses an interpretation of the Rulebook that is appropriate to its own values; however, is bound to regional law and the available range of regional interpretations. As an example, users subscribe to a Rulebook that allows users to anonymously claim to potential consumers that the users are honest under it. A consumer can read the Rulebook to understand the protections that the claim provides and decide whether their trust is well-placed.

In some embodiments, a transactional group provides the Internet with a utility that allows users to participate. Services on today's web are classes of transactional group. The transactional groups of today's web are companies, whereas under this governance framework, utilities can be made up of distributed contributors. For example, a web search utility allows a user to search for content on the web using search terms. This utility provider 128 serves a result set back to the user, who selects one of the results. The context here is that there are rules governing the result set and no rules governing the search terms. To impose rules governing the search terms, two transactions are defined: a user enters a search term, and the search service provider consumes the term to produce the result set.

In accordance with some embodiments of the presently disclosed technology, group access implies honesty. On today's Internet, typically nothing can be implied by access to utility. The presently disclosed technology can help secure more complex networking utilities and allow for provision of integrity to our current ones.

In some embodiments, when a utility provider 128 accepts a Rulebook host based in a sovereign nation, it explicitly accepts transactions to and from that nation, thereby accepting that nation's regulations. If the utility provider 128 cannot find hosts in that nation, it indicates that the transaction type might be illegal there. In some embodiments, a Rulebook appropriate to the transaction type might not exist and therefore the utility provider 128 can create one. By doing so, the utility provider adds a resource to the network. The rules are then subject to impartial review and revision under a multi-stakeholder governance model.

In some embodiments, a utility provider 128 can perform rule definition through inheritance and overrides. Superiority of rules follows the contextual hierarchy from universal, to national, to transactional. Each rule is specified as public, protected, or final. Public rules are optional or can be modified. Protected rules must be implemented and can be modified based on context. Final rules must be implemented and cannot be modified.

Identity Registration and Proof of Honesty

A user (using an associated user device) registers their identity in a way that maintains self-sovereignty by the user and anonymity. In some embodiments, identity registration is performed using applicable decentralised anonymous credentials (DACs). For example, Garman's DAC can be used.

A DAC is self-registered (e.g., computed by the user's own user device and accepted onto a distributed ledger if and only if it is valid) and enables anonymous peer-to-peer (P2P) communication without involving a third party like a Certification Authority (CA). The DAC commits a new identity to an underlying secret (e.g., an alphanumerical string defined or uniquely associated with the user) and allows someone with knowledge of the credential to prove membership of an accumulator by showing it. For example, if a value that was accumulated into the accumulator is known to the user (e.g., having been obtained by an associated user device), the user can produce a short witness token that proves the user knows the value. The witness token is wrapped in a Zero-Knowledge-Proof-of-Knowledge and therefore cannot be used to identify the user.

After registration, the user can augment their identity with credentials provided from many issuers (e.g., Rulebook hosts). The user's capacity to prove honesty is obtained via the issuance of revocable credentials by trusted Rulebook host(s) 118. In some embodiments, proofs of honesty, proofs of personal attributes, and/or other proofs are cryptographic credentials and the user has a wide choice of data disclosure options. In some embodiments, issued credentials are available for the user to use without further interacting with the issuer. In these cases, Rulebook host(s) 118 have no direct control over user transactions unless such control is granted by the user. In some embodiments, users can generate proof tokens until the privilege is revoked by the Rulebook host(s) 118. In some embodiments, users can generate a single proof with contributions from many issuers.

Users (using user devices) show credentials in the form of verifiable cryptographic tokens. Tokens are 'atomic' in that two created by one or more users with the same issuer (e.g., Rulebook host) cannot be meaningfully distinguished from each other. For example, the tokens can appear random. They are identical in the amount of randomness contained in the numbers. If the same underlying secret computes two tokens belonging to the same DAC group with proofs of honesty issued by the same issuer; these two tokens cannot be determined to be from the same user. Likewise, if two different users produce two tokens under the same keys, they cannot be known to be from two different users or from a single user. Identifiers are independent of proofs of honesty, so cannot be linked to previous or future transactions. In other words, it goes to the "current" part of "currently honest" and cannot be used to prejudice. Credentials issued to the same underlying secret by many issuers can be shown together in a single token. Credential pooling from credentials issued to multiple identities is prevented cryptographically.

Two users showing each other such tokens (e.g., one or more DACs) facilitates secure key exchange without revealing any personally identifying features. Each token identifies a corresponding user as a member of a group of possible peers, but the transactional counterpart cannot further discover which particular one the user is within the group.

Clone identities occur when a single natural person has registered more than one identity. Clone identities are problematic for many use cases and should be properly handled. Because the DAC is self-registered, in some embodiments, clone identities are resisted, prevented, or discouraged by associating an attribute-based credential with a unique biometric of the user (e.g., a thumb print pair, DNA sequence, or the like). In some cases clone identities are needed, and they can be considered official clones. For example, the credential allows a user to attest to an entity class, i.e., whether they are of class selected from clone identities {human, legal entity, representative, robot}. To register identities of legal entities, representatives, and/or robots, users publicly register pseudonymous links to their respective human identity.

In some embodiments, when proving ownership of a clone resistant identity, it is unnecessary for a user to reveal the entity class attribute when the credential is shown; proving credential ownership is sufficient to prove that an identity is clone resistant. Without disclosing the entity class attribute, an individual could be orchestrating a swarm of robots. If this is not allowed, a user can assert that an entity class attestation is in {human, entity, representative}. An entity class attestation is also referred to a Sybil attestation in the present application.

An example of proving honesty in accordance with one or more Rulebooks for transaction is provided below. A user, U augments their identity with attributes, A [date of birth, first name, last name, etc] and protections, P from distributed trusted issuers. The protections protect counterparties (e.g., another user or utility provider) who would interact with U.

$$P \leftarrow \begin{matrix} [P_0 \ P_1 \ P_2] \\ [entityClass = human] \end{matrix} U = {}_A^H U$$

The notation here describes a DAC-registered user, with an entity class of "human", that has subscribed to three hosts of a common Rulebook P. P represents the set of all trusted issuers of P and the left arrow represents the user's choice of Rulebook host.

Users transact in groups of two or more and each user seeks protections from Rulebook hosts 118. Illustratively, a transaction is protected in the peer-to-peer setting by Alice and Bob seeking protections that reduce their motivation to cheat as follows.

$$U_A \xrightarrow{[P_2]T_{c_B}\left(V\left({}^hP_{2_A}\right)^{m_A}\right)} U_B$$

$$U_A \xleftarrow{[P_0 \ Q_4]T_{c_A}\left(V_{P_0}\left({}^hP_{0_B}\right)V_{Q_4}\left({}^hQ_{4_B},{}^{m_B}\right)\right)} U_B$$

$[P_2]T_{c_B}$ is Alice's proof of honesty that verifiably proves current ownership of a credential issued by $P_2$. The token is accepted by Bob if he agrees that the Rulebook offers him protection and it contains Bob's challenge, $c_B$ which can guarantee token freshness. The function V(h) verifiably encrypts the revocation handle, h with an inspector public key where the private key belongs to an appropriate inspector, which may or may not be the credential issuer. In this case the private key belongs to the Rulebook issuer $P_2$. The message m is cryptographically bound to the token to guarantee the link between proof of transaction and proof of honesty. Similarly, Bob's proof to Alice is proof of honesty under two Rulebooks $[P_0 \ Q_4]$.

Here, as the revocation authority and inspector is the same as the issuer, and the message only shows the approach to linking transactional data to the proof token, these transactions can be succinctly written as follows.

$$U_A \xrightarrow{[P_2]T_{c_B}} U_B$$

$$U_A \xleftarrow{[P_0 \ Q_4]T_{c_A}} U_B$$

The subscript c on token T is specific to denote a random challenge during an interactive proof. A non-interactive proof might have a subscript d to denote, e.g., a domain name where the token claims honesty. If d=exonym.io the token is claiming honesty under an identified Rulebook for content written to a domain. To specify a URL to an HTML document is a claim of honesty for a specific page on a domain. It follows that tokens can include machine readable metadata that attests to content (e.g., an 'adult-content' flag, or blacklist {'de', 'feedly'}), so that content suitability can be flagged for regions with laws that restrict certain speech or specific platforms.

Groups are denoted by G with superiority indicated by the right arrow with the more superior group on the left. Groups can be real or virtual. For example, real groups are transactional subgroups, transactional groups, and the universal context; virtual groups are real-world established legal frameworks that influence context.

$$G_P \to G_{US} \to G_{NY} \to p \leftarrow {}^{[P_i]}_A U_A \xrightarrow{[P_i]T_{c_F}} G_F$$

The above notation denotes Alice, $U_A$ who joins a transactional group, $G_F$ by proving honesty under a Rulebook $P_i$. Alice subscribed to Rulebook $P_i$ that is legally established in the U.S.A. State of New York, denoted by the virtual groups $G_{US}$ and $G_{NY}$. $P_i$ is a member of p, where $p \subset P$ and members of p are all established in $G_{NY}$. Members of P are all identified as trusted Rulebook hosts 118 by real group $G_P$, which is a single actor who defines the universal context for Rulebook P and identifies trusted hosts, P.

Alice and any other members of the transactional group transact with each other via the group on the basis that the group has verified that all active members are currently honest. In this case, members of the transactional group may or may not require showing of proof between each other at time of transaction(s).

Illustratively, the inheritance and override superiority for the above example is denoted as follows.

$$G_P \quad\quad\quad\quad P_i \quad G_F \quad G_{F_0}$$
$$\begin{bmatrix} f_{r_0} \\ -r_1 \end{bmatrix} \to G_{US} \to G_{NY} \to \begin{bmatrix} r_0 \\ r_1 \\ *r_2 \\ -r_3 \end{bmatrix} \to \begin{bmatrix} r_0 \\ r_2 \\ r_3 \end{bmatrix} \to \begin{bmatrix} r_0 \\ r_1 \\ r_2 \end{bmatrix}$$

Rule status (final (f) protected (*) and public (−)) are noted in top-left script against each defined rule, r. Recall that public rules are optional and can be modified based on context. Protected rules must be implemented and can be modified. Final rules must be implemented and cannot be modified.

The above notation shows consistent implementation of $r_0$. The transactional group $G_F$, which is providing transactional functionality must implement $r_2$ but chooses to implement $r_3$. When a user joins the subgroup $G_{F_0}$ they choose to implement $r_1$ and not implement $r_3$; but cannot exclude $r_2$.

To map this pattern to a real-life scenario: $r_0$ is the purpose of the control and might take its basis from law. To require such protection is voluntary, so it is optional and a group can choose not to apply it. If applied, the rule is final, so it has been written objectively. $r_1$ is guidance to hosts and groups toward an ideal network control. $r_2$ might be a law within a specific region and modification is allowed because the law does not clarify context. $r_3$ is a rule that $P_i$ is willing to enforce if it applies to the transactional context. It may be a high order rule such as a requirement for citation of peer reviewed content. $G_{F_0}$ has the utility of $G_F$, but members are governed by P. Modification of a rule is clarification of rule subjectivity, e.g., modifying "timely" to "within 24 hours of notification."

Rulebook Example

In some embodiments, a Rulebook includes a description, rules, and public data. The description defines the Rulebook's purpose, the rules describe details for enforcement, and the public data allows claims to be verifiable. As an example, the description takes a form of [Rulebook DID, long name, short name, mission summary, mission detail]. A rule takes a form of [rule DID, status, rule header, rule description, modifications]. Here, DID stands for a decentralized identifier.

In some embodiments, the Rulebook description and the rules are published in human readable form and one or more languages (e.g., English) as necessary. The source (e.g., Rulebook host) of a Rulebook computes and publishes data to facilitate peer verification by users. Illustratively, data can be verified via Distributed Ledger Technology (DLT) or via a CA.

Below is an example format of public data published by a Rulebook source via CA, where private key(s) counterpart to the public key(s) are stored securely.

TABLE 1

Example of Rulebook source public data.

| Item | Description |
| --- | --- |
| Credential Specification | Defines a revocable cryptographic credential with a unique credential DID. |
| Presentation Policy | Identifies all trusted issuer public key DIDs |
| Node Information | URLs to network resources and ancillary data. |
| Signatures | Signatures on all public data to prevent modification. |

In some embodiments, a trusted host is established by identifying the source public data. When a host identifies the source, it inherits the source's rules and description (e.g., via a direct copy). The host can further inherit updates to the source's rules and description (e.g., periodically or as triggered by each update). In some embodiments, the host extends the description (e.g., with its own objective or mission). The host can modify the rules as it sees fit, but based on a rule's status and/or its legal or non-legal obligations. This way, the host implements its own approach to control and optionally places further restriction on rule status (e.g., public protected final). Below is an example format of extension public data published by such a host via CA.

TABLE 2

Rulebook extension public data.

| File | Description |
| --- | --- |
| Issuer Public Key | An issuer public key valid to issue only the source's credential specification. |
| Revocation Authority Public Key | The public key that the revocation handle of issued credentials will be bound to. |
| Revocation Information | Support data for the dynamic accumulator. |
| Inspector Public Key | The public key that the revocation handle will be verifiably encrypted with. |
| Node Information | URLs to network resources and ancillary data. |
| Exonym Matrices | Controlled and uncontrolled exonym lists. |
| Signatures | Signatures against all published data. |

Once the host has published the extension public data, it sends the source its URL as a request to be added to the source's presentation policy. The source updates the policy in its public data if it accepts the request.

Rulebook Subscription Management

As discussed above, users are issued revocable credential(s) by trusted Rulebook host(s) 118 and then can prove honesty by showing the credential(s). Revocation by one host would be meaningless if a user can obtain another functionally-equivalent or similar credential from a different host, without accounting for the user's previous actions. Therefore, in some embodiments, a Sybil attestation is required so that users hopping between hosts of equivalent or similar Rulebooks.

The act of showing a credential to prove honesty and of obtaining the credential are two distinct processes. The former reveals current honesty, and the latter is where accountability can be imposed. In some embodiments, a user obtains credential(s) from Rulebook host(s) 118 by using an associated user device 138 to produce a set of self-certified Sybil-free pseudonyms, which facilitate the binding of an identity to multiple pseudonyms. The set of pseudonyms can be compared against pseudonyms in the Rulebook hierarchy.

Illustratively, a user who is bound to an underlying secret can produce exactly one unique pseudonym per distinct domain descriptor (e.g., a scope string). For example, if a scope string of "xyz" is imposed onto a secret 51, that secret 51 can only be used to produce one unique pseudonym associated with "xyz," distinct from a pseudonym produced by imposing any other scope string onto the secret 51. Also, different secrets can only be used to produce their own distinct pseudonym(s). For example, the pseudonym produced by imposing scope string "xyz" onto the secret 51 is distinct from a pseudonym produced by imposing the same scope string "xyz" onto any other secret S2, S3, . . . Sn. Here, this type of pseudonym is referred to as an "exonym." In some embodiments, when a Sybil attestation is required, exonyms can be used as a set of single purpose identifiers and published publicly.

By imposing each rule's DID, as a scope string, onto a user's underlying secret, the user can produce a set of exonyms that can be used to control subscriptions to Rulebook(s). When a user agrees to a Rulebook, the user uses an associated user device 138 to produce a relevant set of exonyms for the rules of the Rulebook and sends the exonyms to an issuer for the Rulebook, and if the exonyms do not already exist within the network of hosts for the Rulebook, the user is issued credential(s) for the Rulebook by the issuer.

As an example, a user U in region u produces exonyms $x=[x_0 \ x_1 \ x_2]$ to obtain a credential from the user's choice of host $P_0$, which enforces rules $r=[r_0 \ r_1 \ r_2]$. $P_0$ appends the exonyms to its public exonym matrix $X_{P_0}$, where each row includes a list of exonyms corresponding to a particular rule. The host $P_0$ then issues the user the credential. $P_0$ is regulated by a regional group $G_u$ via the default protection (e.g., government imposed rules and regulations) or a proof of honesty. The relationship can be illustrated as follows:

$$G_P \to \ldots \to G_u \to X_{P_0} = \begin{bmatrix} P_0 \\ r_0 := \ldots x_0 \\ r_1 := \ldots x_1 \\ r_2 := \ldots x_2 \end{bmatrix} \leftarrow {}^{P_0}U$$

If $P_0$ revokes the credential from the user U, its exonym(s) corresponding to the rule(s) involved with the revocation (e.g., the user U infringed the rule(s)) can be flagged, timestamped, annotated, or otherwise labelled depending on the criteria for re-joining. For example:

If the number of previous offences are to be tracked, the exonym(s) is flagged permanently with distinct flags for each offence; otherwise, the exonym(s) is deleted from the corresponding row(s) after the user has accounted for the infringement.

If there is a time suspension for the offence, then the flag is time marker (e.g., a UTC timestamp).

Below is an example illustrating that the user U's exonym $x_1$ is labelled.

$$X_{P_0} = \begin{bmatrix} r_0 \ldots x_0 \\ r_1 \ldots x_1^* \\ r_2 \ldots x_2 \end{bmatrix}$$

$P_0$ can achieve this by storing the revocation handle of the issued credential with a link to x on an internal database. In some embodiments, to prevent $P_0$ from revoking the credential issued for user for arbitrary reasons or for no reason at all, the handle can be hashed using a one-way hash function (e.g., SHA256) before it is stored. In this case, the associated exonyms can be recovered by extracting the revocation handle, h from the token T using an inspector private key, which is controlled by another entity (e.g., another host $P_1$). It can then be hashed to discover the corresponding exonyms, so that one or more of the exonyms is labelled.

In some embodiments, before issuing the credential to U, $P_0$ performs a network wide summation of public exonym lists from members of P (e.g., searches through the public exonym matrices or lists of all Rulebook hosts in P) and ensures that exonyms in x are not in $X_P$. The relationship can be expressed as $$x \notin X_P = \sum_{i=0}^{n} X_{P_i}.$$

If one of the exonyms does exist in the summation, U is already a subscribed member. If one is flagged, it indicates the corresponding rule was broken by the user.

In some embodiments, as each host can search the network and detect current membership of users, host(s) can allow user subscriptions to the Rulebook by default. Illustratively, a user navigates to a URL and can subscribe automatically, if and only if the user has not previously joined.

As an example, consider a Rulebook controlling for hate-speech. Here, potential users can include all the users of public or semi-public comment boards. Even if thousands of hosts control the Rulebook, it is very expensive to onboard 7 billion users, their authorised robots and/or representatives. If self-onboard is allowed; hosts only need to process users who get revoked.

Default-allow subscription is computationally cheap, efficient, and convenient, which can facilitate broad adoption (e.g., some Rulebooks can require every web user or device to join). Because producing the exonyms requires a Sybil attestation, clones are resisted. If a user cannot join twice, when some evidence of rule infringement is presented which leads to revocation, the user's actions become restricted pending investigation.

Illustratively, for a Rulebook $G_P$, a common rule $*r_0$ can be defined. As it is a protected rule, enforcement of that rule is required by any issuer of P. We define the issuers $[^{r_0 \ r_1 \ r_2}]P_0 \ [^{r_0 \ r_1 \ r_2}]P_1 \ [^{r_0 \ r_1 \ r_2}]P_2]$ where $r_i$ represents the decentralised identifiers of rules within the Rulebook. If a user U subscribes to a Rulebook host $P_0$, the user subscribes to all of the rules, with the exception of any rules where they can already prove honesty. The host publishes exonyms that they control to matrix $X_{P_0}$ and exonyms where the user U could already prove honesty to matrix $Y_{P_0}$. U can join at one host (the origin) and try to join another (the destination) without being revoked, or, try to move to another host after being revoked. The issuer can have common rules (case i), distinct rules at the origin (case ii), and/or distinct rules at the destination (case iii). Revocation can be for a rule that the origin does or does not enforce. The table below shows a few examples of user migration between hosts.

TABLE 3

Joining shared Rulebooks

| Cases | Migration | Origin Exonyms | Destination Exonyms |
|---|---|---|---|
| [i, ii] | $P_0 \to P_1$ | $X_0 \ X_1 \ X_2$ | $X_0 \ X_1$ |
| [i, ii, iii] | $P_0 \to P_2$ | $X_0 \ X_1 \ X_2$ | $X_0 \ X_1 \ X_3$ |
| [i, iii] | $P_1 \to P_2$ | $X_0 \ X_1$ | $X_0 \ X_1 \ X_3$ |

$P_1 \to P_0$, $P_2 \to P_0$, and $P_2 \to P_1$ involve the same combination of cases as $P_1 \to P_2$, $P_0 \to P_2$, and $P_0 \to P_2$, respectively. Shared Rulebook requires at least one common rule. In other words, if there is no common rule enforced by two hosts, then they are issuer of different Rulebooks. In some embodiments, to move from one host to another under a shared Rulebook will always be detected via the common rule identifier, because $x_0 \in X_P$ for an exonym with a scope string of common rule $r_0$.

In some embodiments, credential(s) are revoked under rules that are not controlled by the destination. For example, $^{P_0}U$ is revoked for infringement of rule $r_2$, resulting in $$X_{P_0} = \begin{bmatrix} r_0 & \ldots & x_0 \\ r_1 & \ldots & x_1 \\ r_2 & \ldots & x_2^* \end{bmatrix}$$

and then U attempts to migrate from $[^{r_0 \ r_1 \ r_2}]P_0 \to [^{r_0 \ r_1}]P_1$. To join, $U \Rightarrow x=[x_0 \ x_1] \in X_P$ and so may appear honest under $[r_0 \ r_1]$ if the exonyms are the only consideration. Therefore, the destination can require U to prove honesty under at least the common rule $r_0$. U cannot; to obtain credential from the destination, U needs to reveal or prove that its prior credential has been revoked, which he does via U⇒x=[$x_0$ $x_1$ $x_2$]. The same is true for a distinct rule at the destination, or, at the origin and the destination. The common rule forces disclosure of any rule that was broken.

In some embodiments, gradual agreement to a Rulebook is achieved with common rule(s) across multiple providers. For example, a user $U_A$ has two credentials with common rules, $^{[P_0\ P_1]}U_A$ where $P_0$ enforces rule $r_0$ and $P_1$ enforces r=[$r_0$ $r_1$]. The user $U_A$ obtained credential from $P_0$ and then from $P_1$. The user $U_A$ transacts with another user $$U_B: U_A \xrightarrow{P_1 T_{c_B}} U_B,$$

protecting $U_B$ with $P_1$. $U_B$ is unaware of $P_0$ and $U_A$ breaks rule $r_0$ which is enforced by $P_0$. $U_B$ appeals to $P_1$ to address the infringement, and $P_1$ discovers that rule $r_0$ is controlled by $P_0$ via $X_{P_0}$ triggered by the fact that $x_0$ is on the $Y_{P_1}$ list of host $P_1$. $P_1$ and $P_0$ revoke credentials P from $U_A$ and forward the report to any host where $U_A$ has a credential that would be interpreted by $U_B$ as $U_A$ being honest under $r_0$. To aid inspection this can be more succinctly written as:

$$[r_0]_{P_0} \leftarrow$$
$$[r_0\ r_1]_{P_1} \leftarrow {}^{[P_0\ P_1]}U_A \xrightarrow{[P_1]T_{c_B}} U_B \xrightarrow{T_{c_B}} P_1 \xrightarrow{T_{c_B}} P_0$$
$$\vdots$$

The result is $^{[P_0*\ P_1*]}U_A$ where the asterisk indicates that the credential is revoked.

If $U_A$ broke rule $r_1$ the search for $U_A$ having credentials interpreted by $U_B$ as the user $U_A$ being honest under $r_1$ would not necessarily result in the revocation credentials associated with $r_0$. It would depend on whether the provider enforcing $r_1$ also enforces $r_0$. If so, then the revocation proceeds.

Likewise, if $U_A$ broke rule $r_1$ and credential(s) associated with $r_0$ was revoked; $U_A$ can subscribe to $r_0$ via a different host who does not enforce $r_1$. Based on policy, the new host can impose other accountability for the infringement against rule $r_1$.

Rulebook Changes

In some embodiments, Rulebook changes can be instigated by the source, the hosts, and transactional groups. Changes impact users, and transactional groups who subscribe to and use the changed Rulebook. Adding a trusted host does not impact users. A group can either default allow a new host or manually accept them after review of their interpretation. Removal of a trusted host results in all subscribers to that host failing to verify. Migration from one host to another can be executed by policy: if a user proves honesty under the removed host, then the user can prove exonyms and be granted membership under their new choice of host. In some embodiments, adding, modifying, or removing rules forces users and groups into an agreement or quit negotiation. When the source or host adds rules or updates the DID, the peer agrees by producing exonyms under the new DIDs. In some embodiments, the transactional groups can only modify rules and the modifications should be agreed by the user(s) when they next access the group.

Figure 2:
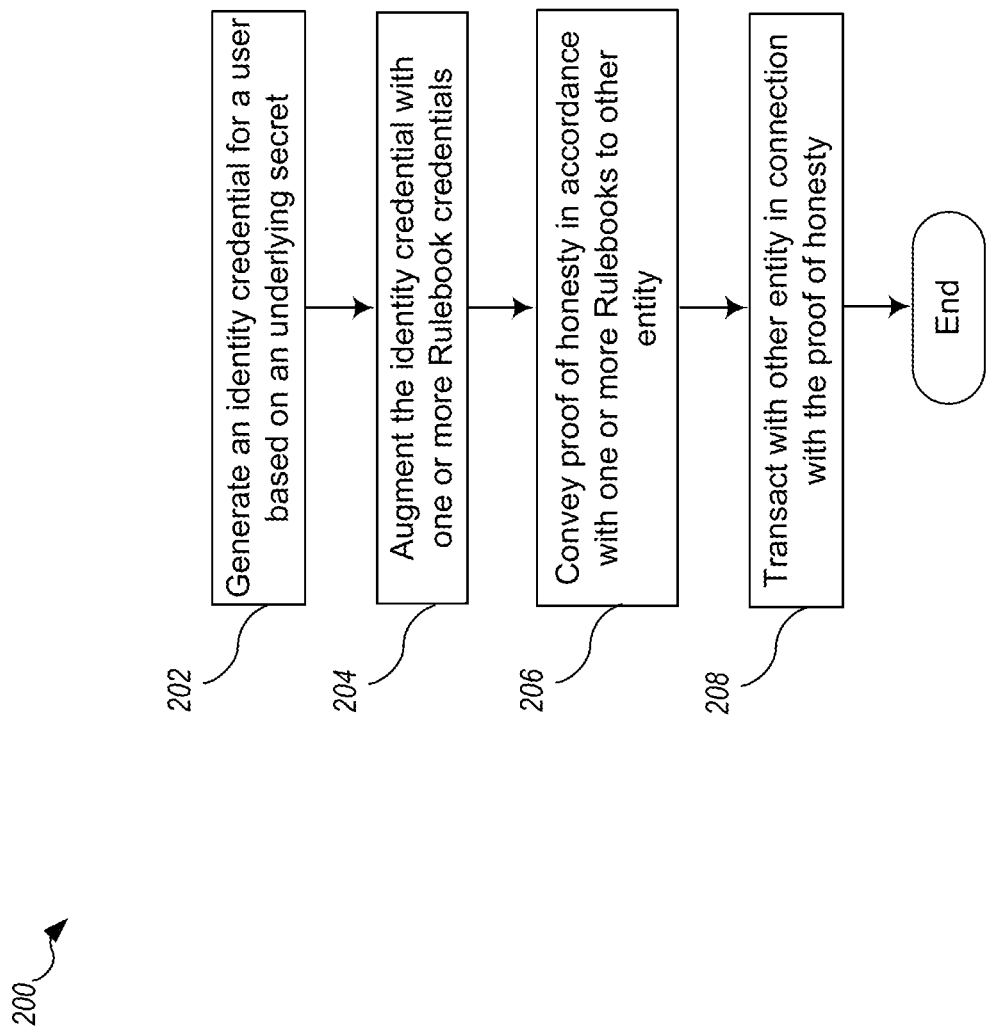
FIG. 2 is a flow diagram depicting an example process for performing Rulebook-based transaction in accordance with some embodiments of the techniques described herein.

FIG. 2 is a flow diagram depicting an example process 200 for performing Rulebook-based transaction in accordance with some embodiments of the techniques described herein. Illustratively, the process 200 can be performed by a user device 138 in the environment 100 of FIG. 1.

The process 200 starts at block 202, which includes generating an identity credential for a user based on an underlying secret. As described above in connection with FIG. 1, in some embodiments, a user device 138 performs identity registration for the user using applicable DAC(s). As an example of the identity credential, the DAC commits a new identity to an underlying secret (e.g., an alphanumerical string defined or uniquely associated with the user) and allows someone with knowledge of the credential to prove membership of an accumulator by showing it.

At block 204, the process 200 includes augmenting the identity credential with one or more Rulebook credentials. As described above in connection with FIG. 1, in some embodiments, the user device 138 can augment the identity credential with Rulebook credentials provided from many issuers (e.g., Rulebook hosts). The user's capacity to prove honesty is obtained via the issuance of revocable credentials by trusted Rulebook host(s). In some embodiments, proofs of honesty, proofs of personal attributes, are/or other proofs are cryptographic credentials and the user has a wide choice of data disclosure options. In some embodiments, the user device 138 can generate a single proof with contributions from many issuers.

At block 206, the process 200 includes conveying proof of honesty of the user in accordance with one or more Rulebooks to other entity. As described above in connection with FIG. 1, in some embodiments, the user device 138 send or otherwise show proof of honesty of the user (e.g., credentials in the form of verifiable cryptographic tokens) that verifiably proves current ownership of the one or more Rulebook credentials. In some embodiments, the proof is accepted by the other entity if the other entity agrees that the Rulebooks corresponding to the credentials offer proper protection and the proof also contains the other entity's challenge, which can guarantee token freshness.

At block 208, the process 200 includes transacting with the other entity in connection with the proof of honesty. As described above in connection with FIG. 1, in some embodiments, the user device 138 also transmits or otherwise conveys a message that is cryptographically bound to the proof of honesty, to guarantee the link between proof of transaction and proof of honesty.

Those skilled in the art will appreciate that the various operations depicted via FIG. 2, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 3:
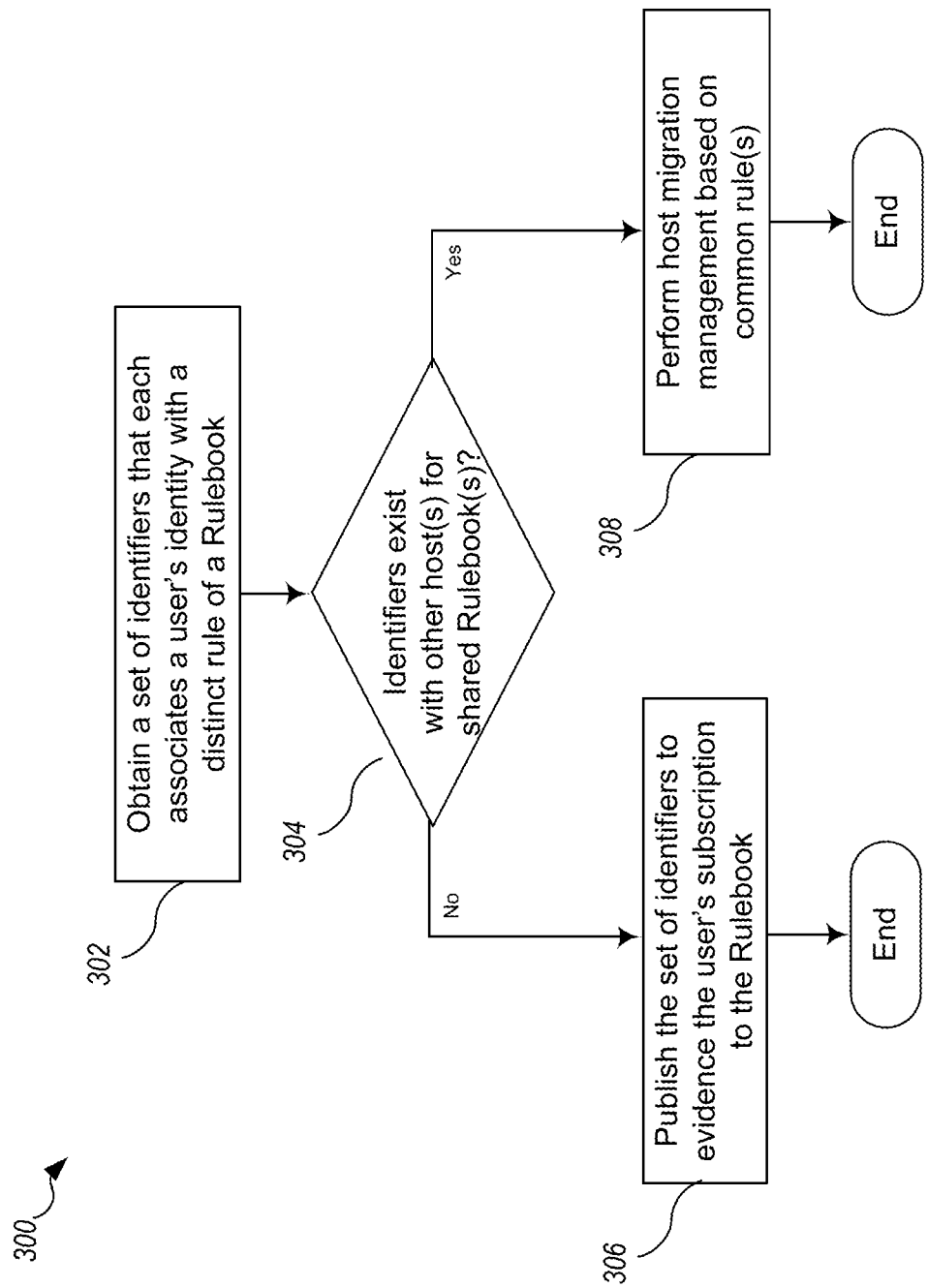
FIG. 3 is a flow diagram depicting an example process for managing Rulebook subscription in accordance with some embodiments of the techniques described herein.

FIG. 3 is a flow diagram depicting an example process 300 for managing Rulebook subscription in accordance with some embodiments of the techniques described herein. Illustratively, the process 300 can be performed by Rulebook host(s) 118 in the environment 100 of FIG. 1.

The process 300 starts at block 302, which includes obtaining a set of identifiers that each associates a user's identity with a distinct rule of a Rulebook issued or otherwise hosted by a Rulebook host 118. As described above in connection with FIG. 1, in some embodiments, the set of identifiers is a set of distinct pseudonyms (e.g., exonyms) that bind a user's underlying secret with distinct scope strings (e.g., different rules' DIDs). When a user agrees to the Rulebook, the Rulebook host 118 requests the set of identifiers. In response, the user uses an associated user device 138 to produce a relevant set of exonyms for the rules of the Rulebook and sends the exonyms to the Rulebook host 118.

At block 304, the process 300 includes determining whether any identifiers in the set already exists with other host(s) for shared Rulebook(s). As described above in connection with FIG. 1, in some embodiments, the Rulebook host 118 searches through the public exonym matrices or lists of all Rulebook hosts for shared Rulebook(s) (e.g., which include at least one rule in common with the Rulebook hosted by the Rulebook host 118) to see if they include any exonyms provided by the user. If none of the identifiers exist with other host(s) for shared Rulebook(s), the process 300 proceeds to block 306

At block 306, the process 300 includes publishing the set of identifiers to evidence the user's subscription to the Rulebook. As described above in connection with FIG. 1, in some embodiments, the Rulebook host 118 appends the user-provided exonyms to its public exonym matrix or list, where each row includes a list of exonyms corresponding to a particular rule of the Rulebook. The Rulebook host then issues the user one or more credential(s), e.g., by sending them to the user associated user device 138. In some embodiments, the credential(s) is associated with an expiration time and need to be renewed by the user from time to time. In some embodiments, as each host can search the network and detect current membership of users, host(s) can allow automatic user subscriptions to the Rulebook by default.

Referring back to block 304, if one or more of the identifiers exist with other host(s) for shared Rulebook(s), the process 300 proceeds to block 308, which includes performing host migration management based on common rule(s). As described above in connection with FIG. 1, in some embodiments, if one of the user-provided exonyms exists in the network of common Rulebook hosts, the user is already a subscribed member. If an exonym is flagged, it indicates the corresponding rule was broken by the user. As described above in more detail, shared Rulebooks require at least one rule in common. The Rulebook host 118, in some cases with other host(s), manages host migration based on the common rule(s).

Those skilled in the art will appreciate that the various operations depicted via FIG. 3, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
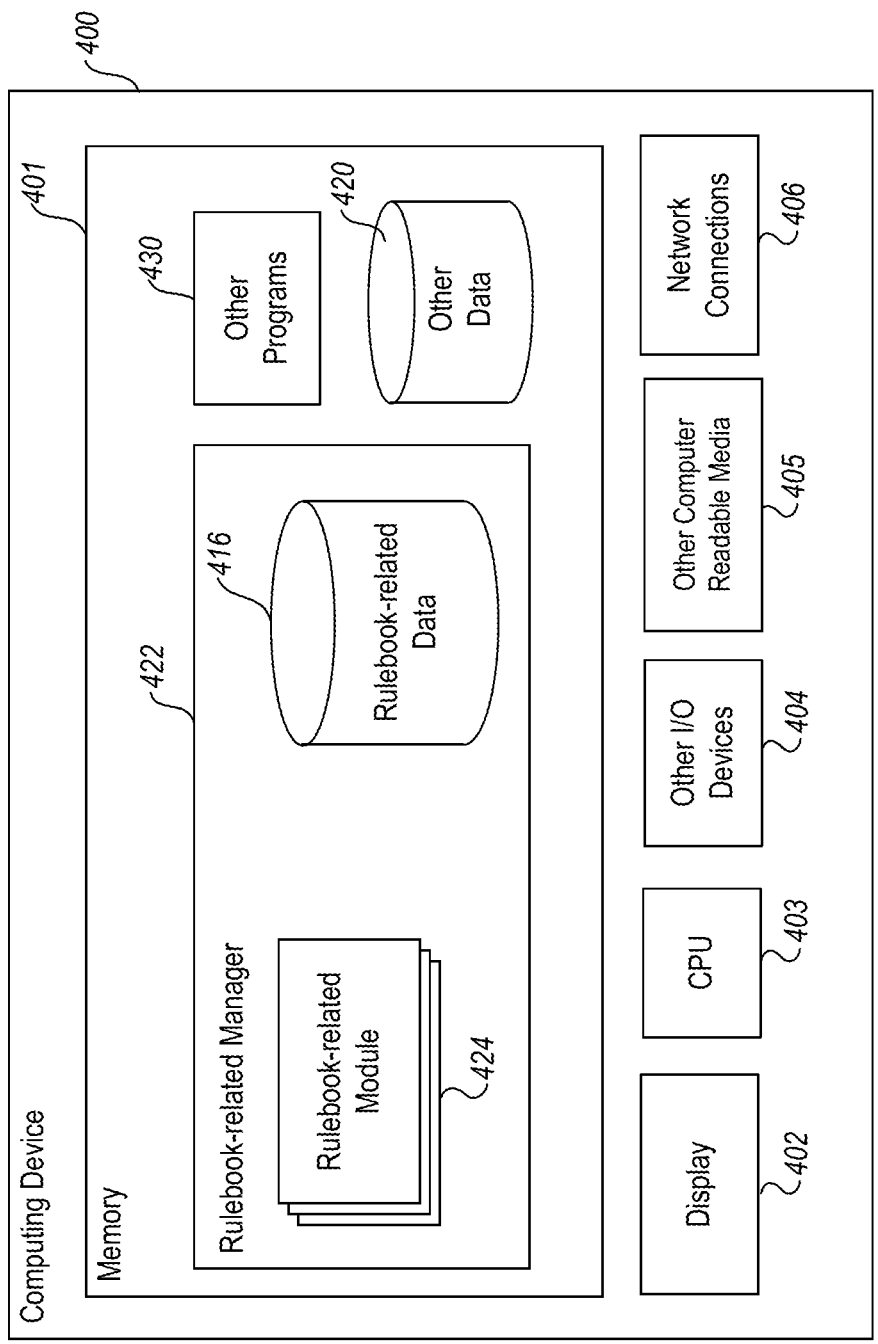
FIG. 4 is a block diagram illustrating elements of an example computing device utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to a user device 138, Rulebook host 118, utility provider 128, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the Rulebook-related manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units ("CPU") 403, Input/Output ("I/O") devices 404 (e.g., keyboard, mouse, RF or infrared receiver, universal serial bus (USB) ports, High-Definition Multimedia Interface (HDMI) ports, other communication ports, and the like), other computer-readable media 405, and network connections 406. The Rulebook-related manager 422 is shown residing in memory 401. In other embodiments, some portion of the contents and some, or all, of the components of the Rulebook-related manager 422 may be stored on and/or transmitted over the other computer-readable media 405. The components of the computing device 400 and Rulebook-related manager 422 can execute on one or more CPUs 403 and implement applicable functions described herein. In some embodiments, the Rulebook-related manager 422 may operate as, be part of, or work in conjunction and/or cooperation with other software applications stored in memory 401 or on various other computing devices. In some embodiments, the Rulebook-related manager 422 also facilitates communication with peripheral devices via the I/O devices 404, or with another device or system via the network connections 406.

The one or more Rulebook-related modules 424 is configured to perform actions related, directly or indirectly, to Rulebook(s). In some embodiments, the Rulebook-related module(s) 424 stores, retrieves, or otherwise accesses at least some Rulebook-related data on some portion of the Rulebook-related data storage 416 or other data storage internal or external to the computing device 400.

Other code or programs 430 (e.g., further data processing modules, a program guide manager module, a Web server, and the like), and potentially other data repositories, such as data repository 420 for storing other data, may also reside in the memory 401, and can execute on one or more CPUs 403. Of note, one or more of the components in FIG. 4 may or may not be present in any specific implementation. For example, some embodiments may not provide other computer readable media 405 or a display 402.

In some embodiments, the computing device 400 and Rulebook-related manager 422 include API(s) that provides programmatic access to add, remove, or change one or more functions of the computing device 400. In some embodiments, components/modules of the computing device 400 and Rulebook-related manager 422 are implemented using standard programming techniques. For example, the Rulebook-related manager 222 may be implemented as an executable running on the CPU 403, along with one or more static or dynamic libraries. In other embodiments, the computing device 400 and Rulebook-related manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the Rulebook-related manager 422. In some embodiments, instructions cause the CPU 403 or some other processor, such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a Rulebook-related manager 422 implementation. Also, other functions could be implemented and/or performed by each component/module, and in different orders, and by different components/modules, yet still achieve the functions of the computing device 400 and Rulebook-related manager 422.

In addition, programming interfaces to the data stored as part of the computing device 400 and Rulebook-related manager 422, can be available by standard mechanisms such as through C, C++, C #, and Java APIs; libraries for accessing files, databases, or other data repositories; scripting languages such as XML; or Web servers, FTP servers, NFS file servers, or other types of servers providing access to stored data. The Rulebook-related data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the Rulebook-related manager 422.

Furthermore, in some embodiments, some or all of the components of the computing device 400 and Rulebook-related manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. In cases where the present patent application conflicts with an application or other document incorporated herein by reference, the present application controls. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for performing networked transaction with proof of honesty, the method comprising:
generating an identity credential for a first user based, at least in part, on an underlying secret associated with the first user;
augmenting the identity credential for the first user with one or more Rulebook credentials issued by one or more Rulebook hosts, the one or more Rulebook credentials indicating the first user's subscription to one or more Rulebooks;
conveying, to a second user, proof of honesty of the first user that cryptographically verifies the first user's subscription to the one or more Rulebooks, with randomness that anonymizes the first user among subscribers to the one or more Rulebooks, wherein the proof of honesty of the first user is based, at least in part, on the augmented identity credential for the first user; and
causing performance of a transaction between the first user and the second user based, at least in part, on the proof of honesty of the first user.

2. The method of claim 1, wherein the underlying secret associated with the first user includes an alphanumerical string.

3. The method of claim 1, wherein the identity credential for the first user includes a decentralized anonymous credential.

4. The method of claim 1, further comprising obtaining the one or more Rulebook credentials from the one or more Rulebook hosts.

5. The method of claim 4, wherein obtaining the one or more Rulebook credentials comprises generating one or more identifiers each associating the first user's identity with a distinct rule of a Rulebook.

6. The method of claim 5, wherein generating one or more identifiers each associating the first user's identity with a distinct rule of a Rulebook is based, at least in part, on an identifier of the distinct rule.

7. The method of claim 4, wherein generating the one or more identifiers comprises computationally imposing a domain descriptor associated with a rule onto the underlying secret associated with the first user.

8. The method of claim 1, further comprising obtaining proof of honesty of the second user in accordance with one or more Rulebooks.

9. The method of claim 8, wherein causing performance of the transaction between the first user and the second user is further based on the proof of honesty of the second user.

10. One or more computer-readable media not consisting of signal per se, the one or more computer-readable media collectively having contents configured to cause one or more processors to perform actions comprising:
generating an identity credential for a first user based, at least in part, on an underlying secret associated with the first user;
augmenting the identity credential for the first user with one or more Rulebook credentials issued by one or more Rulebook hosts, the one or more Rulebook credentials indicating the first user's subscription to one or more Rulebooks;
conveying, to a second user, proof of honesty of the first user that cryptographically verifies the first user's subscription to the one or more Rulebooks, with randomness that anonymizes the first user among subscribers to the one or more Rulebooks, wherein the proof of honesty of the first user is based, at least in part, on the augmented identity credential for the first user; and
causing performance of a transaction between the first user and the second user based, at least in part, on the proof of honesty of the first user.

11. The one or more computer-readable media of claim 10, wherein the proof of honesty includes a proof token generated based on the augmented identity credential for the first user.

12. The one or more computer-readable media of claim 11, further comprising generating the proof token based further on a challenge from the second user.

13. The one or more computer-readable media of claim 10, wherein augmenting the identity credential for the first user further comprises augmenting the identity credential for the first user with one or more identity attributes of the first user.

14. The one or more computer-readable media of claim 10, wherein the actions further comprise obtaining the one or more Rulebook credentials from the one or more Rulebook hosts.

15. The one or more computer-readable media of claim 10, wherein the one or more Rulebook hosts form a hierarchy of Rulebooks.

16. A system, comprising:
one or more processors; and
memory storing contents that, when executed by the one or more processors, cause the system to:
obtain a set of identifiers each anonymously associating a user's identity with a distinct rule of a Rulebook hosted by a first Rulebook host;
determine whether any identifier from the set of identifiers exists with a second Rulebook host; and
manage the user's subscription to the Rulebook based, at least in part, on the determining by acting on one or more credentials for proving honesty of the user in association with the Rulebook in accordance with a result of the determining.

17. The system of claim 16, wherein the contents further cause the system to, responsive to determining that no identifier from the set of identifiers exits with the second Rulebook host:
publishing the set of identifiers to evidence the user's subscription to the Rulebook; and
issuing the one or more credentials for proving honesty of the user in association with the Rulebook.

18. The system of claim 16, wherein the second Rulebook host hosts a Rulebook that shares at least a common rule with the Rulebook hosted by the first Rulebook host.

19. The system of claim 18, wherein the contents further cause the system to, responsive to determining that at least one identifier from the set of identifiers exits with the second Rulebook host, perform host migration management based, at least in part, on the common rule.

20. The system of claim 18, wherein performing host migration management is further based on obtaining proof of honesty of the user associated with the common rule.

21. The system of claim 16, wherein the Rulebook hosted by the first Rulebook host includes at least one rule that (a) is inherited from a Rulebook hosted by the second Rulebook host or (b) overrides a rule of the Rulebook hosted by the second Rulebook.

\* \* \* \* \*